June 20, 1939. F. P. FORD ET AL 2,163,361
MEANS OR DEVICE FOR PROTECTING THE HOOFS OF ANIMALS
Filed May 5, 1936 2 Sheets-Sheet 2

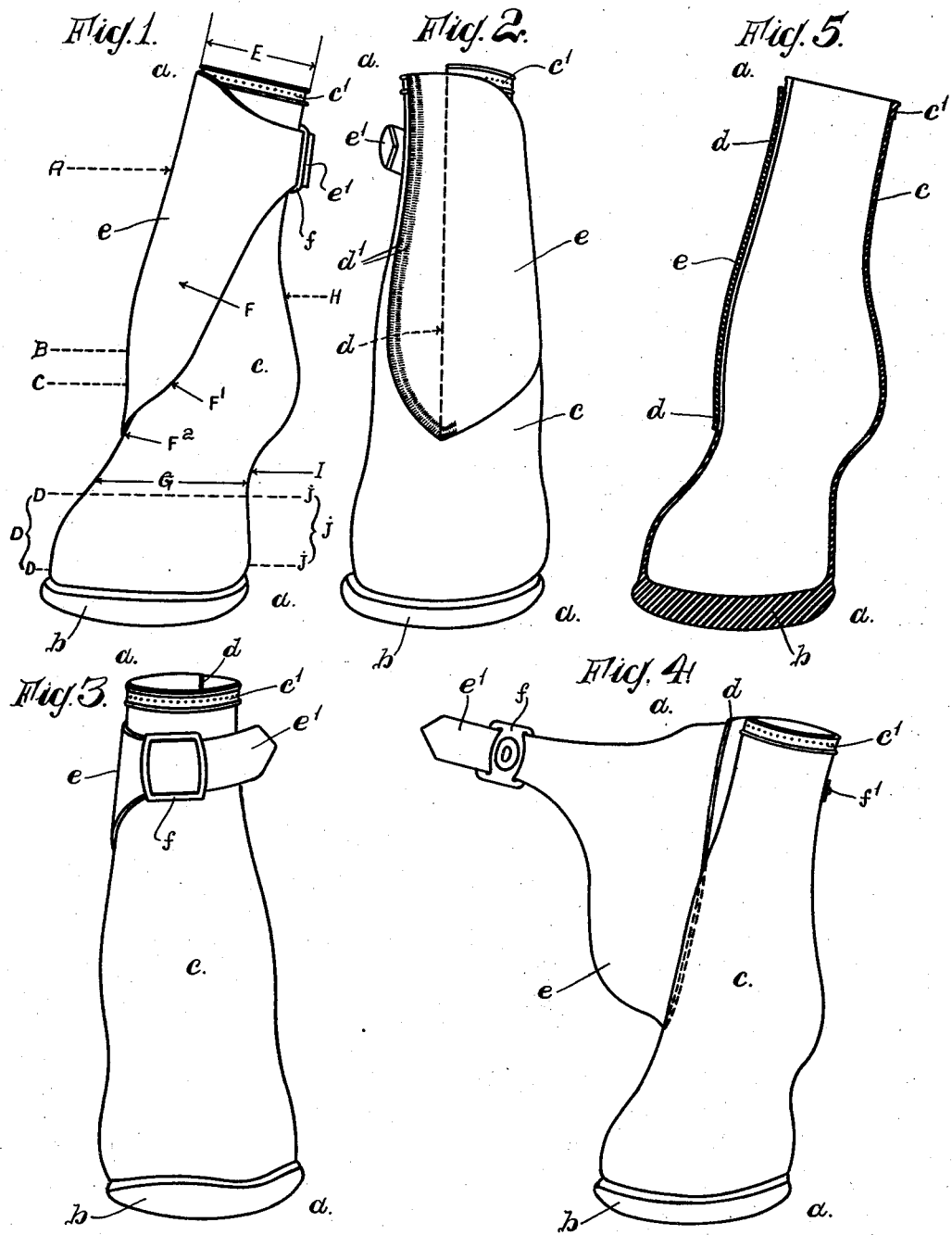

INVENTORS
FREDERICK P. FORD,
ALBERT C. COPE AND
ARTHUR G. H. GOUGH
BY William C. Linton
ATTORNEY Patented June 20, 1939

2,163,361

UNITED STATES PATENT OFFICE 2,163,361

MEANS OR DEVICE FOR PROTECTING THE HOOFS OF ANIMALS

Frederick Percy Ford, Cheddar, Somerset, Albert Charles Cope, Winscombe, Somerset, and Arthur George Henry Gough, Tweentown, Cheddar, Somerset, England Application May 5, 1936, Serial No. 78,066
In Great Britain May 24, 1935

1 Claim. (Cl. 168—2)

This invention relates to the cure and prevention of disease or affections in the hoofs of animals and prevention of the spread thereof.

An animal hoof and leg covering, according to our invention, is of anatomical construction, being adapted to closely and naturally fit or conform to the hoof and adjacent part of the leg when applied thereto, and having at its upper end an adjustable opening and fastening from which extends a downward slit terminating at a desired point above the sole; and a flap or wrap-over piece combines or co-operates with said slit to retain the anatomical fitting and water-proof features of the covering, the material of which is rubber or other waterproof and pliable substance.

We will further describe our invention with the aid of the accompanying sheet of explanatory drawings which illustrate, by way of examples only, two modes of carrying the same into effect.

In said drawings:

Figs. 1 to 3, inclusive, are side elevation, front view and rear view, respectively, of one form of covering adapted to fit or conform to the roof and lower part of the leg of a sheep.

Fig. 4 is a view similar to Fig. 1, but illustrating the securing flap or wrap-over piece of the hoof covering in an open position.

Fig. 5 is a side sectional elevation of the hoof covering illustrated in the preceding views.

In the several views like characters of reference denote like or equivalent parts wherever they occur.

Figure 6:
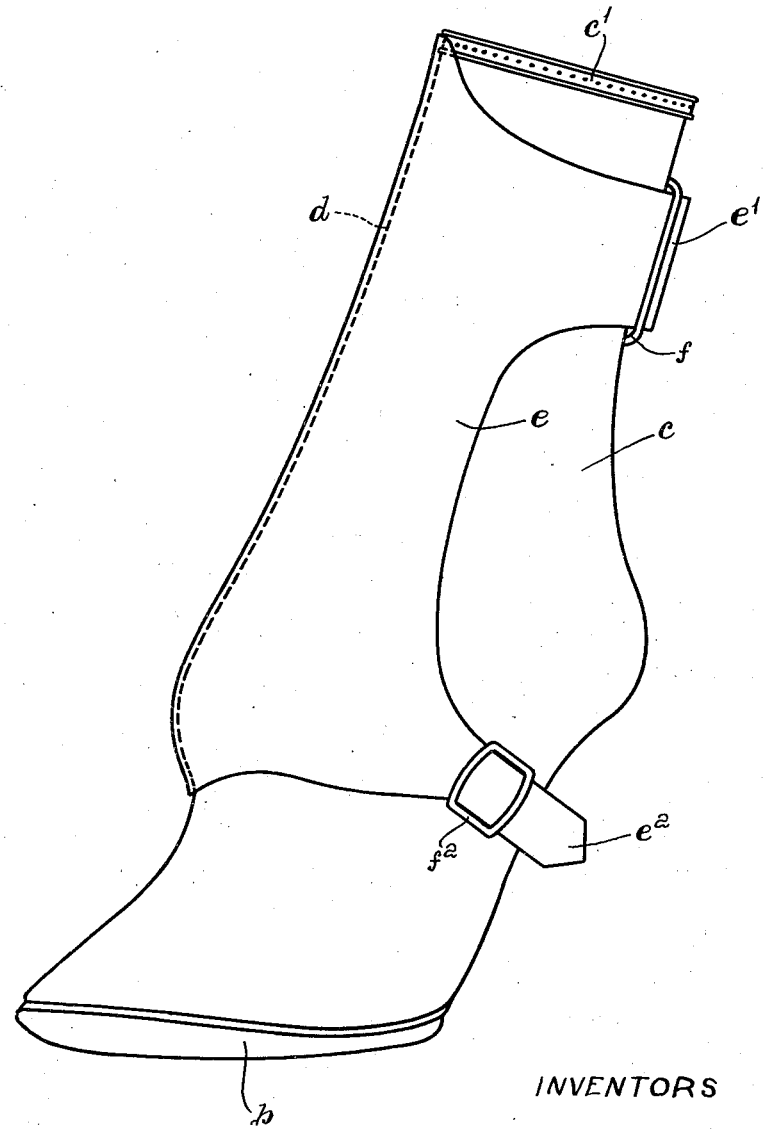
Fig. 6 is a side elevation of a larger covering adapted for fitment to the hoof of a cow or like bovine animal.

Referring first more particularly to Figs. 1 to 5 inclusive, $a$ generally indicates the hoof-covering—the slope or angle shown being the natural stance of the foot—adapted to be applied to and snugly fit and conform to the hoof and nearby portion of the leg of a sheep, and which hoof covering $a$ includes a thickened sole or sole portion $b$ and an upper or leg covering portion or shaped sleeve $c$ having extending downwardly from the top thereof a frontal slit or opening $d$ which terminates at a desired point above the sole $b$. A thinner flap or wrap-over piece $e$ is secured at a side of said slit $d$ by vulcanization along line $d^1$, and is formed with a strap extension $e^1$ which is threaded through and adjustably carries one or socketed buckle component $f$ of a snap fastener. The other or co-operating fastener component $f^1$ is secured near the top of the upper or leg covering portion $c$ and in such position as to be engaged by the buckle component $f$ when the flap $e$, $e^1$ has been adjusted around the leg of a sheep after the hoof has been entered into the covering $a$, such application being facilitated by reason of the provision of said slit or opening $d$.

The roof-covering $a$ is of anatomical construction having—see Fig. 1—an outward curve between points A and B designed to provide for "play" of the fetlock joints when the sheep is walking; and an inward curve from C to D is in accordance with the corresponding inward curve of the foot upward from the coronet at the point D, so enabling close fitment of the leg portion of the covering in order to prevent splashing of chemicals which may be contained in the covering with the leg above the coronet during walking.

The circumference of the covering $a$ towards the top of the leg part $c$ is proportioned to the configuration of the leg, and the flap or wrap-over piece $e$, $e^1$, and adjustable buckle fastening $f$ enable adjustment for close fitting. The circumference at E and for a suitable distance (say about one and a half inches for a sheep covering) down the leg will be proportional to the size of the covering.

The buckle $f$ may be adjusted on the strap portion $e^1$ and in cases where the leg of the animal is thickly covered with wool the strap fastening can be extended to provide for this condition. Any suitable alternative to said adjustable buckle fastening may be employed.

Said flap $e$ is also curved outward between points A and B, which permits free backward and forward movement in walking and minimizes rubbing or chafing of the joints. Such flap arrangement is adapted for easy putting on and removal of the covering and to enable the obtaining of an anatomical fit when the covering is on.

The shaping of the flap $e$ at the points $F^1$ and $F^2$ is designed to give a complete cover to the foot when the covering is being worn and as it is important for ease of putting on and taking off and to keep the foot dry, and also for the retention of the remedies used in the cure of footrot, the point $F^2$ should be, as illustrated in the example, situated at about two inches from the point at which the sole $b$ and upper portion $c$ of the covering are united.

The reduced circumference at G occurs directly below the fetlock joint of the foot and is shaped to conform to same and down towards sole $b$.

The bag-like or pocket portion between H and I provides ample space for the knuckles, and the contraction at H tends to enhance the fitting of the upper portion $c$ of the covering $a$ to the upper corresponding portion of the leg. Similarly, the contraction from I to the sole $b$ tends to better fitment of the hoof part of the foot from that point downward.

From D and J downward the covering takes the shape of the walls of the hoof, whilst the close fitting so derived of the covering from D and J down around the hoof will facilitate the maintaining in position of dressings, or of sponges inserted in the covering.

The upper portion $c$ of the covering $a$ is of pliable and waterproof rubber: the sole portion $b$ is also of rubber, and although said sole portion is of greater thickness than that of the upper portion it is pliable and "gives" to the tread.

The shaping of the sole $b$ is such that loose sponges cut to shape and placed on the inner sole surface will remain in place, as also will dressings applied to the pads or between the hoofs.

The covering produced is light in weight and is lined throughout. The top edge of the covering is re-inforced at $c^1$ to enhance its rigidity.

Said hoof-covering $a$ may be constructed of any suitable pliable and water-proof material other than as before referred to, such as canvas or leather suitably treated for the purpose; and such material may, if desired, be treated or impregnated with an arsenical or other suitable curative preparation.

In the example illustrated, the upper or leg-covering $c$ with flap $e$, $e^1$ is made from sheet rubber—the flap $e$, $e^1$ being somewhat less in thickness—having a lining $c^1$ of suitable fabric, as for instance, stockingette; and if desired, minute perforations for air circulation may be formed in the material: further, the sole portion may, if desired, be strengthened or reinforced by an insertion of canvas, or the like, placed between the outer and inner sole faces. Means, as steel studs, or the like, may be affixed to the sole to prevent slip and enhance its wearing qualities; or the sole tread $b$ may be grooved, slotted or patterned to effect this end.

The illustration of Fig. 6 depicts a larger covering adapted for fitment to a cow. The main characteristics of this covering are substantially similar to the smaller covering previously described, with the exception that the flap or wrap-over piece $e$ is provided with an additional lower strap extension $e^2$ which has a buckle fastening $f^2$ as before described, in order to enhance the fitment of the covering and the positioning of the flap $e$. The thickness of the wall of the covering above the bag-like or pocket portion will preferably be somewhat increased in order to stiffen the covering at this part.

For securing the covering around the leg of an animal we may employ—as alternatives and/or in addition—an elastic band, or laces, or fasteners of sliding clasp or other suitable type: but any convenient form of adjustable fastening may be adopted which assists in preventing the admission of insects to the roof. Furthermore, the leg portion of the covering may be of a more or less elastic nature and so adapted to grip the animal's leg.

In a covering designed for application to a cloven hoof, there may be provided in the hoof covering $a$—being secured to the sole $b$ thereof—an inward projecting member of suitable shape or configuration and so situated that when the covering is applied to the hoof said projection will enter between the hoof pads and so maintain the same apart to prevent chafing. Alternatively, a pad separating member may form a separate or non-integral fitting, and in this case may include a pair of rubber bands or clips, or the like which are placed on the hoof prior to application of the covering: said bands or clips may be associated with a rubber ball, cap, block, or the like, of appropriate contour and which is positioned between the pads of the hoof to serve the same purpose as the hereinbefore described pad separating member.

Sleeves or separable linings of various sizes may be provided for insertion, when desirable, in the covering to reduce the size of same. Such sleeves may be constructed of material similar to that of the covering, or any other suitable pliable and/or preferably waterproof substance, and will be constructed with or without an aperture adapted to take over an internal pad separating member when fitted; and means may be provided for attachment of a sleeve to the leg covering in order to prevent accidental displacement thereof during wear. Said sleeves may, if desired, be provided with a sole portion.

There may be applied to the inner surface of the sole $b$ of said covering $a$, a pad of sponge or rubber or other suitable soft or resilient material, and, in cases where a pad separating member is affixed to the sole, provision may be made to permit the penetration of said member through the sponge. Alternatively, a pad-separating member and sponge, or the like, may be constructed as a single unit and adapted for convenient fitment in the covering.

The sponge, or the like, when non-integral, may fit and be anchored in a groove or countersunk portion formed in the inner wall of the covering and at or near the sole thereof.

In some instances said sponge, or like facing, may be removable so as to facilitate renewal, and, if practicable, is secured to a base of canvas, or the like, adapted to rest upon the sole.

There may be included in the structure of said sponge, or the like, a pad-separating member which may be more rigid or stiffer than the portion of sponge, or the like, surrounding same.

Said hoof coverings will, of course, be constructed in various sizes and configurations other than those illustrated in the drawings to suit the hoofs to which they are to be applied, and the toe portions may be re-inforced or strengthened in order to improve their serviceability in use.

An interior projection or rib may be provided in the front of the covering to serve or assist to stiffen same for an appropriate distance from the sole upward, in order to prevent creasing; or, alternatively, this object may be achieved by thickening the quality of the rubber from the line D to J downward. Such projection or rib may also serve to splay the hooves and assist in maintaining the covering in position, in which latter case the internal sponges, if used, will be provided with a small triangular cut or corresponding recess formed in the front to fit said projection or rib—a further aid in maintaining the sponges in position.

It is to be noted that all embodiments of coverings under our invention provide for the retention of remedies, exclusion of mud and dirt, and maintenance of the wounded member clean and in a sterilised condition; whilst the anatomical fit of the covering enables the animal to follow its normal habits of grazing and movement, as being in the fields and cropping are important for the maintenance of general condition and recovery to health of the animal.

What we claim as our invention and desire to secure by Letters Patent is:

A device for protecting the hoofs of cloven-hoofed animals being of an anatomical construction to closely and naturally fit the hoof and adjacent part of the leg when applied thereto having the upper portions thereof forming an adjustable opening, one side having a slit formed therein from said opening extending downward to a given point, and an adjustable wrapover piece extending from one side of said slit and so shaped as to maintain the anatomical fitting of said device.

FREDERICK PERCY FORD.
ALBERT CHARLES COPE.
ARTHUR GEORGE HENRY GOUGH.